United States Patent
Wang

(10) Patent No.: US 9,633,558 B2
(45) Date of Patent: Apr. 25, 2017

(54) PROCESSING METHOD AND APPARATUS FOR IMPLEMENTING CONTROL OF TARGET DEVICE

(71) Applicant: Huawei Technologies Co., Ltd., Shenzhen, Guangdong (CN)

(72) Inventor: Junxiu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 14/141,047

(22) Filed: Dec. 26, 2013

(65) Prior Publication Data

US 2014/0104091 A1 Apr. 17, 2014

Related U.S. Application Data

(63) Continuation of application No. PCT/CN2012/085025, filed on Nov. 22, 2012.

(30) Foreign Application Priority Data

Dec. 22, 2011 (CN) .......................... 2011 1 0435471

(51) Int. Cl.
*H04L 17/02* (2006.01)
*G08C 19/00* (2006.01)
*H04M 1/725* (2006.01)

(52) U.S. Cl.
CPC ........ *G08C 19/00* (2013.01); *H04M 1/72533* (2013.01)

(58) Field of Classification Search
CPC .......... H04M 1/72533; H04M 1/72519; G08C 19/00; G06F 9/44
See application file for complete search history.

(56) References Cited

U.S. PATENT DOCUMENTS

| 8,937,534 B2* | 1/2015 | Kreiner ............... H04M 1/7253 340/12.22 |
| 8,995,981 B1* | 3/2015 | Aginsky ............... G08C 17/02 455/419 |
| 2003/0234737 A1 | 12/2003 | Nelson et al. |

(Continued)

FOREIGN PATENT DOCUMENTS

| CN | 1620025 A | 5/2005 |
| CN | 1679062 A | 10/2005 |

(Continued)

*Primary Examiner* — Ryan Sherwin
(74) *Attorney, Agent, or Firm* — Leydig, Voit & Mayer, Ltd.

(57) ABSTRACT

A processing method for implementing control of a target device includes: providing an interface for confirming or inputting a target device identifier; receiving a target device identifier confirmed or selected by a user; providing an interface for confirming or selecting a function parameter of a target device; receiving a function parameter of a target device confirmed or selected by the user; providing a control interface image; and generating and storing, according to the received target device identifier and function parameter that are sent by the user and correspondence between the function parameter of the target device and a value of a control signal, correspondence among the target device identifier, an operation instruction for the control interface image, and the value of the control signal.

16 Claims, 9 Drawing Sheets

(56) References Cited

U.S. PATENT DOCUMENTS

2007/0080845 A1     4/2007   Amand
2011/0035706 A1*   2/2011   Kinoshita ................. G06F 8/38
                                                                         715/835
2011/0131513 A1*   6/2011   Yamamoto ............ G06F 9/4443
                                                                         715/763

FOREIGN PATENT DOCUMENTS

| CN | 1879137 A | 12/2006 |
| --- | --- | --- |
| CN | 101315727 A | 12/2008 |
| CN | 102541547 A | 7/2012 |

* cited by examiner

Please click to add other functions:

| Brightness increase | Brightness decrease | Channel 1 | Channel 2 |
| Channel 3 | Channel 4 | Channel 5 | Channel 6 |
| Channel 7 | Channel 8 | Channel 9 | Channel 0 |
| Mute | Input signal AV/TV | Contrast | — / — — / — — — |

# PROCESSING METHOD AND APPARATUS FOR IMPLEMENTING CONTROL OF TARGET DEVICE

CROSS-REFERENCE TO RELATED APPLICATIONS

This application is a continuation of International Patent Application No. PCT/CN2012/085025, filed on Nov. 22, 2012, which claims priority to Chinese Patent Application No. 201110435471.1, filed on Dec. 22, 2011, both of which are hereby incorporated by reference in their entireties.

TECHNICAL FIELD

The present invention relates to control technologies, and in particular, to a processing method and apparatus for implementing control of a target device.

BACKGROUND

Various remote control devices of household electrical appliances are complex, and various manufacturers have long committed themselves to improving the universality and convenience of remote control devices. For example, Chinese Patent Application No. 200480032767 entitled "universal remote control apparatus with touchscreen" provides a universal remote control apparatus (2) to replace original remote control apparatuses used to remotely control different electrical appliances. Refer to FIG. 1a and FIG. 1b. The universal remote control apparatus (2) includes a remote control signal transmitter (8), a receiver (16), a memory unit (106), a touchscreen (6), and a camera (20). If a function of an original remote control apparatus (referring to an original factory controller matching a target device) needs to be added to the universal remote control apparatus (2), an image (14) of the original remote control apparatus is taken, and a function corresponding to a button on the original remote control apparatus is allocated to a corresponding sub-image of a button of the image (14). This may be performed in a fast learning step. For example, a remote control signal transmitted by an original remote control apparatus is detected and the fingerprint of the signal is stored, so that the signal can recur if the image of a button on the universal remote control apparatus is pressed.

A controller disclosed by the Apple Inc. has six buttons, that is, "Menu", "Play/Stop", Volume Up, Volume Down, "Previous/Rewind", and "Next/Fast-forward". A remote control device must first match an iTunes database or an Apple TV and then can control content playback.

However, the foregoing prior art sometimes still requires a user of a remote control device to input control instructions for different target devices according to different control interfaces, and the remote control device must store corresponding interface functions of various target devices, which wastes the storage resources of the device; sometimes, a complex control interface of a control device can hardly be identified after being scaled down to a commonly used mobile communication device; sometimes, the setting of a remote control device is excessively complex and only applicable to a special target device having a setting function for the remote control device, which has limited universality, and is especially not compatible with various target devices of different manufacturers.

SUMMARY

In view of the preceding defects, the present invention aims at further improving the universality or convenience of a control device.

According to one aspect, an embodiment of the present invention provides a processing method for implementing control of a target device, including: providing an interface for confirming or inputting a target device identifier; receiving a target device identifier confirmed or selected by a user; providing an interface for confirming or selecting a function parameter of a target device; receiving a function parameter of a target device confirmed or selected by the user; providing a control interface image, where the control interface image is a visual operation interface used to control the target device and displayed through a screen; and generating and storing, according to the received target device identifier and function parameter that are sent by the user and the control interface image and correspondence between the function parameter of the target device and a value of a control signal, correspondence among the target device identifier, an operation instruction for the control interface image, and the value of the control signal. By providing the control interface image, the universality of a control apparatus set by the user is especially enhanced.

Exemplarily, the method further includes providing an interface for confirming or selecting a control interface image; and receiving setting information, sent by the user, about confirming or selecting the control interface image. In this way, the control interface image itself may also be confirmed or selected by the user, and the flexibility of control of the target device may further be improved.

Exemplarily, the method further includes generating and displaying, through the screen, a control interface image that has been set with the target device identifier and the function parameter; and receiving and identifying an operation instruction of the user for the control interface image, querying the stored correspondence to obtain a value of a corresponding control signal, and generating and sending a corresponding control signal. In this way, the control interface image set by the user implements control for the target device.

Exemplarily, the method further includes receiving and storing an original parameter, about control configuration, of the target device, where the original parameter includes a function parameter and a value of a control signal corresponding to the function parameter. In this embodiment, the scalability of the control apparatus is enhanced, and the control of various target devices can be concentrated on the control apparatus.

Exemplarily, the storing an original parameter, about control configuration, of the target device specifically includes: storing only a function parameter confirmed or selected by the user and a value of a control signal corresponding to the function parameter. In this way, in this setting manner, only a control function parameter that will be used by the user is stored, the storage space of the control apparatus is saved, and therefore, the universal possibility of a control device is further improved.

Exemplarily, the step of providing an interface for confirming or selecting a function parameter of a target device specifically includes: displaying a function parameter of a target device to be confirmed or selected, displaying a function parameter combination of a target device to be confirmed or selected, or displaying a function parameter combination to be confirmed or selected for a whole of multiple target devices; accordingly, the step of receiving a function parameter of a target device confirmed or selected by the user further includes: receiving a function parameter of a target device confirmed or selected by the user, a function parameter combination of a target device in the unit of working modes, or a function parameter combination in the unit of working modes for a whole of multiple target devices. In these embodiments, the flexible setting of a control interface is further improved, and accordingly, it becomes possible to flexibly implement control for a target device (or a combination).

According to another aspect, an embodiment of the present invention provides a processing apparatus for implementing control of a target device, including a control interface setting unit (110) and a signal configuration unit (120) communicating and connecting to the control interface setting unit (110), where the control interface setting unit (110) is configured to provide an interface for confirming or inputting a target device identifier, receive a target device identifier confirmed or selected by a user, provide an interface for confirming or selecting a function parameter of a target device, receive a function parameter of a target device confirmed or selected by the user, and provide a control interface image; and the signal configuration unit (120) is configured to generate and store, according to the target device identifier and function parameter that are sent by the user and received by the control interface setting unit (110) and correspondence between the function parameter of the target device and a value of a control signal, correspondence among the target device identifier, an operation instruction for the control interface image, and the value of the control signal. By providing the control interface image, the universality of a control apparatus set by the user is especially enhanced.

Exemplarily, in the control interface setting unit (110), a module providing a control interface image is further configured to provide an interface for confirming or selecting a control interface image and receive setting information, sent by the user, about confirming or selecting the control interface image. In this way, the control interface image itself may also be confirmed or selected by the user, and the flexibility of control of the target device may further be improved.

Exemplarily, the processing apparatus further includes a control interface display unit (140), configured to generate and display, through a screen, a control interface image that has been set with the target device identifier and the function parameter; and an operation instruction parsing apparatus (130), configured to receive and identify an operation instruction of the user for the control interface image, obtain the value of the control signal according to the correspondence in the signal configuration unit (120), and forward the value of the control signal to a control signal sending apparatus (180). In this way, the control interface image set by the user implements control for the target device.

Exemplarily, the processing apparatus further includes the control signal sending apparatus (180), configured to generate, according to the received value of the control signal, a control signal and send the control signal to a target device identified by the target device identifier, so as to implement a remote control function on the target device. Preferably, the processing apparatus further includes:

a communication unit (150), configured to receive and store an original parameter, about control configuration, of the target device, where the original parameter includes a function parameter and a value of a control signal of the function parameter. In this embodiment, the scalability of the control apparatus is enhanced, and the control of various target devices can be concentrated on the control apparatus.

Exemplarily, the communication unit (150) is specifically configured to receive and store only a function parameter confirmed or selected by the user and a value of a control signal corresponding to the function parameter. In this way, in this setting manner, only a control function parameter that will be used by the user is stored, the storage space of the control apparatus is saved, and therefore, the universal possibility of a control device is further improved.

According to another aspect, an embodiment of the present invention provides a system for implementing remote control, including any one of foregoing apparatuses, and a server (03), configured to provide an original parameter of a target device, where the original parameter includes a function parameter and a value of a control signal corresponding to the function parameter.

The embodiments provided above may facilitate a method and an apparatus for uniformly controlling one or more target devices or a flexible and convenient setting method, and some embodiments may further save the storage resources of a control apparatus.

DESCRIPTION OF EMBODIMENTS

Figure 1A:
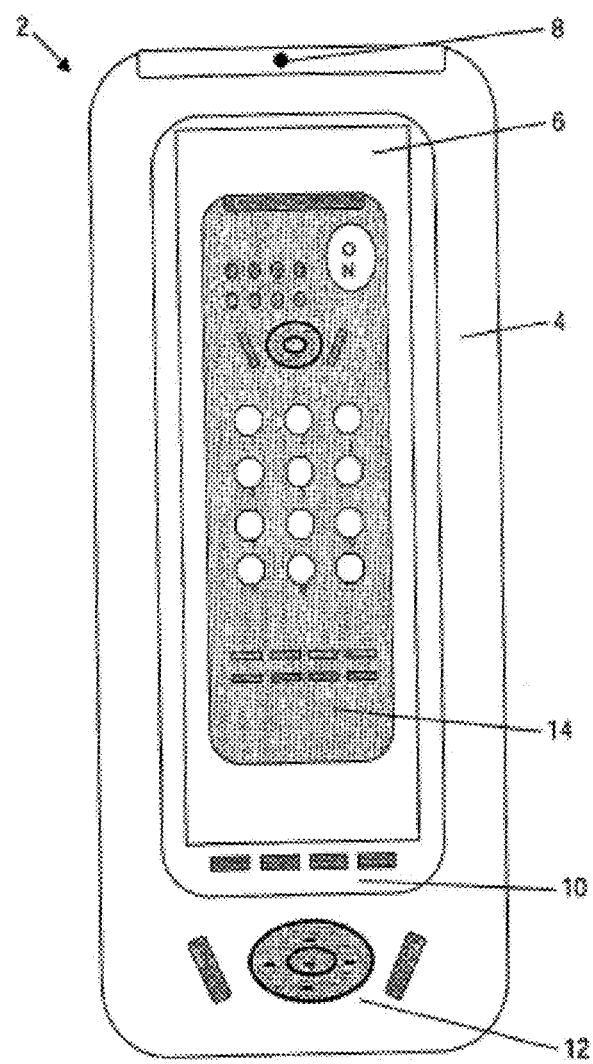
FIG. 1a is a schematic structural diagram of an apparatus in a solution in the prior art.
Figure 1B:
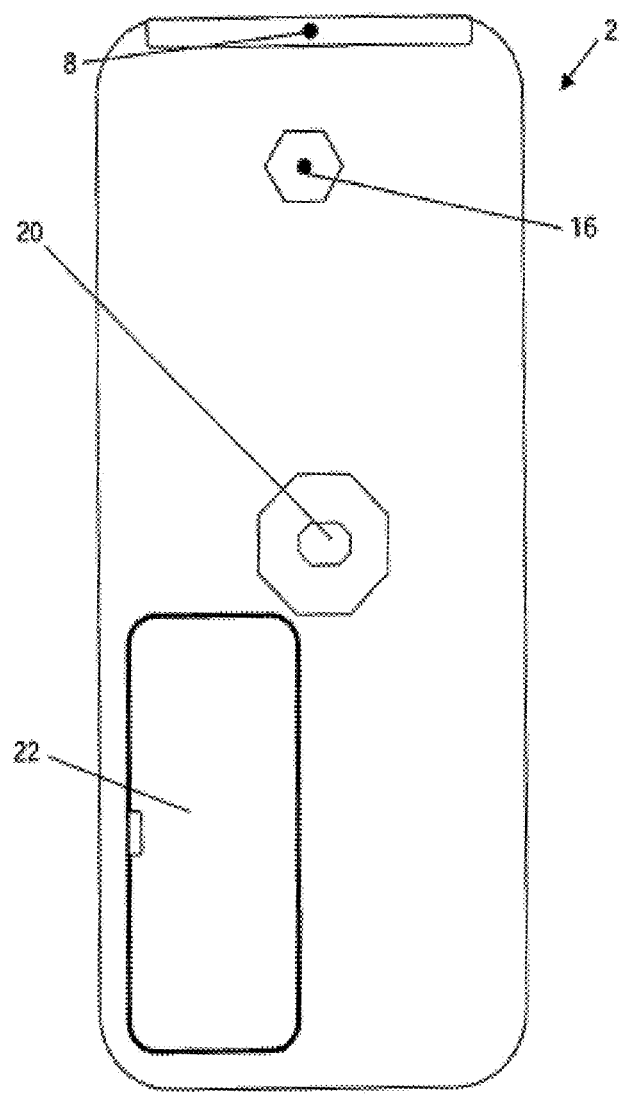
FIG. 1b is a schematic structural diagram of an apparatus in another solution in the prior art.
Figure 2:
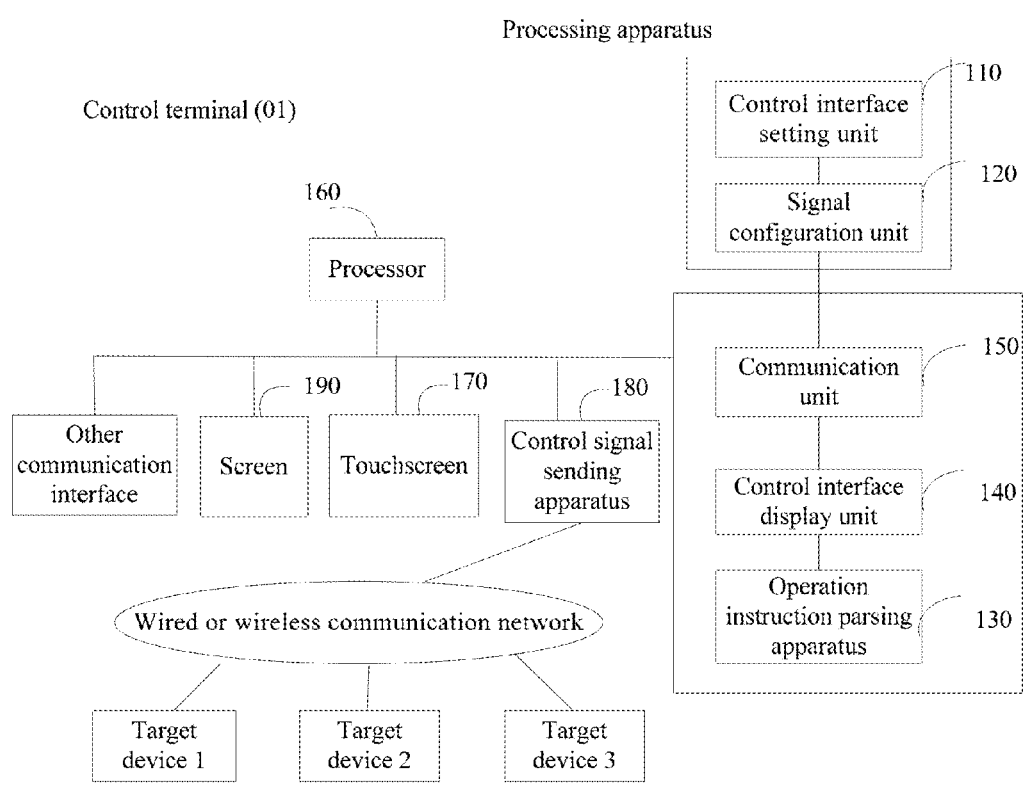
FIG. 2 is a schematic architecture diagram of a system for setting a control terminal according to an embodiment of the present invention.
Figure 3:
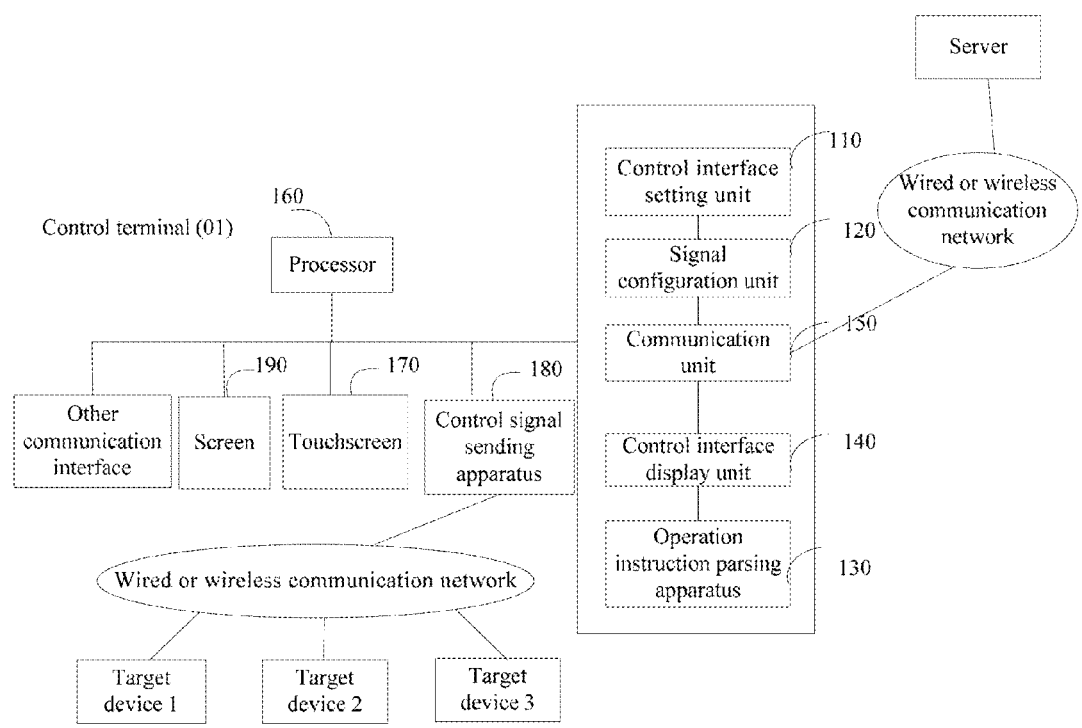
FIG. 3 is a schematic architecture diagram of a system for setting a control terminal according to another embodiment of the present invention.

Refer to FIG. 2 and FIG. 3. Schematic diagrams of an application environment system according to an embodiment of the present invention are shown, and the system includes multiple communication devices communicating with each other through wired or wireless communication networks. These communication networks include but are not limited to a mobile communication network (mobile telephone network), a wireless local area network (wireless Local Area Network (LAN)), a Bluetooth network (Bluetooth personal area network), an Ethernet (Ethernet LAN), a token ring local area network (a token ring LAN), a wide area network (a wide area network), the Internet (the Internet), and the like.

In the system shown in FIG. 2 or FIG. 3, a control terminal (01) may include but is not limited to a mobile device (mobile device), a PDA apparatus (a combination PDA and mobile telephone) supporting mobile communications, a PDA, an integrated messaging device (integrated messaging device (IMD)), a personal computer (personal computer), a notebook computer (notebook computer), and a tablet computer. These terminals can move and can also be located on a movable device, such as, but not limited to a car, a truck, a taxi, a bus, a ship, an aircraft, a bicycle, a motorcycle, and the like. The control terminal (01) may access to one or more application servers 04 through the wireless network and/or the wired network, so as to acquire an application provided by the one or more application servers 04. The network may include other communication devices of various kinds.

The communication devices may implement a communication process based on various transmission technologies, including but not limited to code division multiple access (Code Division Multiple Access, CDMA), global system for mobile communications (Global System for Mobile Communications, GSM), universal mobile telecommunications system (Universal Mobile Telecommunications System, UMTS), time division multiple access (Time Division Multiple Access, TDMA), frequency division multiple access (Frequency Division Multiple Access, FDMA), Transmission Control Protocol/Internet Protocol (Transmission Control Protocol/Internet Protocol, TCP/IP), short message service (Short Message Service, SMS), multimedia messaging service (Multimedia Messaging Service, MMS), e-mail, instant messaging service (Instant Messaging Service, IMS), Bluetooth Bluetooth, IEEE 802.11, and the like. The communication devices may use different media resources, including but not limited to radio (radio), infrared (infrared), laser (laser), cables (cable connection), and the like.

The control terminal (01) has a user interface, which can receive an operation instruction, and has a graphical display function for a control interface, which is at least configured to set, according to an original parameter of a target device that is provided by a server (03), other setting information, and an operation instruction of a user, a universal control interface of the control terminal (01) and receive, after the setting is completed, the operation instruction of the user to implement control for the target device. Specifically, the user interface may be a screen, a touchscreen, a keyboard, and the like. The screen and the touchscreen may have an overlapped position structure and may also have other separated position structures.

Specifically, the control terminal (01) may be a mobile communication terminal and may also be other handheld devices, such as a PDA, various types of tablet computers, or a dedicated control terminal.

The system shown in FIG. 2 further includes one or more target devices. A target device is a device controlled by the control terminal (01), may be various types of electrical appliances, may be a household electrical appliance, and may also be an electrical appliance located on a movable device (such as a car), including but not limited to a television, a set-top box, a home theater, an electric curtain, a refrigerator, an oven, a fan, a light, a CD player, and the like.

In a specific example, a processing apparatus shown in FIG. 2 for implementing control of a target device is an apparatus, such as a chip, or a software plug-in, or another possible combination of software and hardware, that can be installed on the control terminal (01). The apparatus includes a control interface setting unit (110) and a signal configuration unit (120), and these two units (110 and 120) communicate with and connect to each other.

Specifically, the control interface setting unit (110) is configured to provide an interface for confirming or inputting a target device identifier, receive a target device identifier confirmed or selected by a user, provide an interface for confirming or selecting a function parameter of a target device, receive a function parameter of a target device confirmed or selected by the user, and provide a control interface image. The control interface image refers to a visual operation interface used to control the target device and displayed through a screen.

Optionally, the function of providing a control interface image may be providing a default control interface image. In the embodiment of the default control interface image, a setting process of control interface may further be saved. Alternatively, the control interface setting unit (110) may further be configured to provide an interface for confirming or selecting a control interface image and receive setting information, sent by the user, about confirming or selecting a control interface image. In this embodiment where the user confirms or selects the control interface image, a flexible interface may further be provided to allow users to implement control of the target device according to their own habits.

Preferably, the control interface setting unit (110) may obtain, according to the control interface image and the target device identifier and function parameter that are confirmed or selected by the user, at least correspondence between the target device identifier, an operation instruction for the control interface image, and the function parameter, referred to as first correspondence. In a practical example, the control interface setting unit (110) may perform no processing of correspondence of related information.

For example, the first correspondence may record a target device identifier only once, without a need to repeatedly record the target device identifier; for a target device identifier, there may be one or more control interface images; for a control interface image, there may be one or more operation instructions, such as finger movement instructions in different directions for the same control interface image, or touch instructions in different induction areas for the same control interface image; however, each specific operation instruction should correspond to a definite function parameter (referring to an application function unit of a target device, for example, turning up volume by a unit, increasing temperature by a unit, and the like). For example, for operation instructions of long press in a circular central area of a control interface image, an odd number of times means power-on, and an even number of times means shutdown.

The signal configuration unit (120) is configured to generate and store, according to the received target device identifier and function parameter, the function parameter of the target device, and a value of a corresponding control signal, correspondence among the target device identifier, the operation instruction for the control interface image, and the value of the control signal.

Preferably, when the control interface setting unit (110) processes and obtains the first correspondence, the signal configuration unit (120) may be configured to generate and store, according to the first correspondence and correspondence between the function parameter of the target device and the value of the control signal, correspondence among the target device identifier, the operation instruction for the control interface image, and the value of the control signal, which is referred to as second correspondence, so as to subsequently implement control for the target device according to an operation instruction of the user for the control interface image and the stored second correspondence. Alternatively, when the control interface setting unit (110) does not further process data, the signal configuration unit (120) generates and stores, according to the setting information (the target device identifier and the function parameter) obtained by the control interface setting unit (110), the control interface image (default, confirmed, or selected), and the obtained correspondence between the function parameter of the target device and the value of the control signal, the correspondence among the target device identifier, the operation instruction for the control interface image, and the value of the control signal.

An original parameter, about control configuration, of a target device is a value of a corresponding control signal for implementing various function parameters of the target device. For example, in an infrared remote control technology, it may refer to an infrared ray frequency corresponding to various functions of a target device; in a near-field communication technology, it refers to an RF frequency corresponding to various functions of a target device; in a Bluetooth communication technology, according to various Bluetooth standards 1.1, 1.2, or 2.0 and another standard, it refers to a Bluetooth message and the like corresponding to various functions of a target device; and it may also be a control signal under other communication protocols. A process how a control signal controls a target device is not described herein.

Refer to a schematic structural diagram of the control terminal (01) shown in FIG. 3, which is an embodiment of the control terminal (01) that may include the control interface setting unit (110) and the signal configuration unit (120), and may further include a communication unit (150), configured to receive and store, through a communication network (wired or wireless), at least an original parameter, about control configuration, of a target device, where the original parameter includes a function parameter and a value of a control signal corresponding to the function parameter (for example, specific original parameters in Table 1).

Optionally, the control terminal (01) may further include a control interface display unit (140), configured to display, through a screen, a control interface that has been set by the control interface setting unit (110); and an operation instruction parsing apparatus (130), configured to identify an interface operation instruction of the user for an interface parameter, obtain the value of the control signal according to the second correspondence in the signal configuration unit (120), and forward the value of the control signal to a control signal sending apparatus (180).

Preferably, the control terminal (01) may further include the control signal sending apparatus (180), configured to send, according to the received value of the control signal, the control signal to a target device to which the target device identifier points, so as to implement a control function on the target device.

Alternatively, the control signal sending apparatus (180) may be an apparatus set independently from a control terminal (01)*a*, receives, through various communication protocols, a value of a control signal sent by the control terminal (01)*a*, and then generates and sends a control signal to a target device. Specifically, the control signal may be an infrared signal, a Bluetooth signal, a near-field communication signal, or a communication signal complying with another communication protocol, and it is not limited in each embodiment.

Alternatively, a computer readable storage medium such as a ROM/RAM, a magnetic disk, or an optical disk is provided for storing a related instruction. Functions of the preceding modules are completed when the instruction is performed by a computer or a processor.

It should be noted that the previously mentioned first correspondence or second correspondence may be stored in the form of data tables and may also be stored in another possible form, such as character strings and the like.

Figure 4:
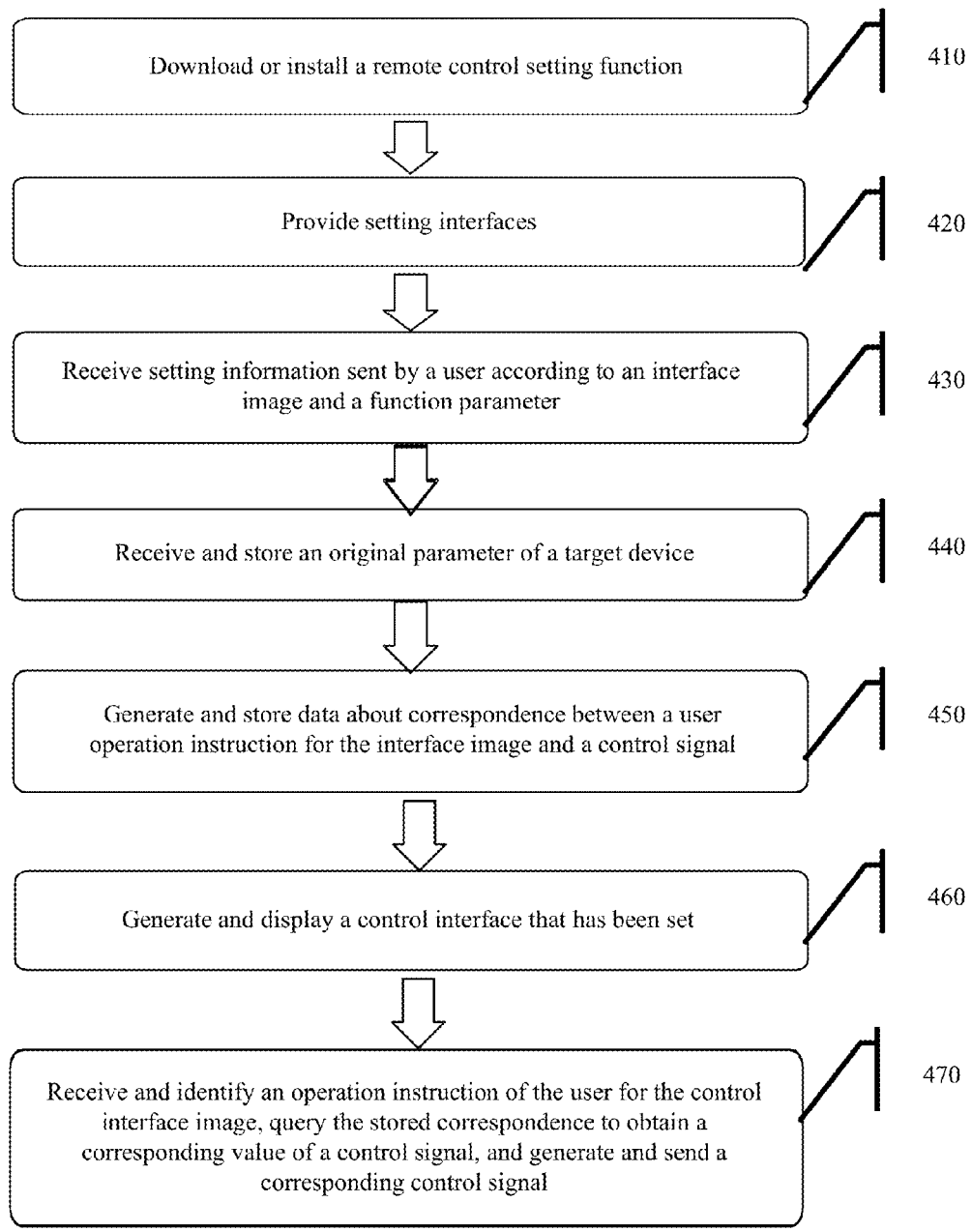
FIG. 4 is a schematic flowchart of a process of setting a universal control interface according to an embodiment.

Refer to FIG. 4, which is a schematic diagram of a process of setting a control interface. The system in FIG. 2 is taken as an example to describe a process of setting a control terminal (01) and implementing control of the control terminal (01). The setting process includes:

410. Optionally, receive a downloaded or installed function module for setting a control interface and run the function module for setting a control interface. For example, download or install a module including the foregoing "control interface setting unit (110) and signal configuration unit (120)", and start the module.

For example, a "Download/install a control device" button or a link address may be displayed on the control terminal for a user to trigger. Certainly, for the system shown in FIG. 2, this step 410 does not need to be performed.

420. Provide setting interfaces, where the setting interfaces include an interface for confirming or inputting a target device identifier, and an interface for confirming or selecting a function parameter, and may further include a control interface image.

In this embodiment, step 420 and step 430 are divided only in logic, where the process of providing setting interfaces and that of receiving setting parameters may be performed alternately or simultaneously and are not limited to the order mentioned in this embodiment. Or rather, information such as the setting interfaces mentioned in this embodiment may be provided at a time or for multiple times.

Preferably, the process of providing setting interfaces includes displaying the setting interfaces through a screen on the control terminal (01). Specifically, the information such as the setting interfaces mentioned in this embodiment may be completely displayed at a time, or multiple setting interfaces are separately displayed, or a part of setting interfaces are displayed together. Such embodiments are conducive for flexibly implementing control interface setting.

Preferably, in the process of providing setting interfaces, a default and fixed visual operation interface, that is, a control interface image, for controlling a target device may further be provided, and therefore, the user does not need to perform confirmation or selection, so that communication resources are saved; optionally, an interface for confirming or selecting a control interface image may also be provided for the user to perform confirmation or selection, and therefore, the method is more flexible.

Preferably, the providing an interface for confirming or selecting a function parameter includes: displaying a function parameter of a target device to be confirmed or selected, displaying a function parameter combination of a target device to be confirmed or selected, or displaying a function parameter combination to be confirmed or selected for a whole of multiple target devices.

In a specific embodiment, to further improve the universality of a control terminal and the convenience of settings, the preceding "to be confirmed" refers to displaying information recommended by default for the user to confirm, where the information recommended by default is calculated and obtained according to some logical information; and the logical information includes a type of a target device (for example, a most commonly used function of such type of target devices), a common usage scenario of a target device, a demand situation of using multiple target devices (for example, curtains, lighting devices, and entertainment devices need to be closed during sleep and rest), and the like. Accordingly, the function parameter of the target device to be confirmed is a function parameter recommended by default according to the type of the target device; the function parameter combination of the target device to be confirmed is a function parameter combination recommended by default according to a usage scenario of the target device; and the function parameter combination to be confirmed for the whole of multiple target devices is a function parameter combination recommended by default according to a demand of using the multiple target devices. Specifically, reference may be made to Table 1, where a progressive manner or a non-progressive manner does not need to be distinguished.

Preferably, to further improve the universality of the control terminal and the convenience of settings, function parameters of various electrical appliances are classified into progressive parameters and non-progressive parameters, and corresponding control interface images are classified into progressive control interface images and non-progressive control interface images.

A progressive parameter serves as a primary parameter and may be a most commonly used basic parameter, such as volume, temperature, and the like, according to the type of a target device. Accordingly, a progressive control interface image is a control interface image, such as a homogeneous linear image, an incremental linear image, and a bilaterally symmetrical long-type image, embodying linear changes of a value of a certain function. In the interface for confirming or selecting a control interface image, a default progressive control interface image may be provided for the user to determine; or multiple options are provided for the user to select.

A non-progressive parameter serves as a secondary function parameter. Several commonly-used function parameters recommended by default, such as channel and brightness, may be first displayed according to the type of a target device; and the user is inquired whether other function configurations need to be added, and function parameter options are provided for the user to select. Accordingly, a non-progressive control interface image is a control interface image embodying jumping changes of multiple functions and may be of a rudder type or ring type, and the technical details may be expounded subsequently.

The primary parameter and secondary function parameter that are recommended by default may be set for types of different target devices, application scenarios, and use habits of users. Therefore, data storage is further reduced, a setting process of the user is simplified, and usage convenience is optimized for the user. For example, reference is made to the following Table 1.

TABLE 1

| Type of Target Device | Progressive Control Interface Image and Recommended Primary Function Parameter | Non-progressive Control Interface Image and Recommended Secondary Function Parameter |
|---|---|---|
| Broadcast-type audio and video devices (television, television set-top box, and radio) | Volume | On/off, channel + 1, channel − 1, and others |
| Non-broadcast-type audio and video devices (acoustic device, home theater, in-car media device, and the like) | Volume | On/off, play/pause, fast-forward, rewind, menu, and others |
| Air conditioner | Temperature | On/off, windy, no wind, dehumidification, and others |
| Refrigerator | Temperature | |
| Dehumidifier | Humidity | On/off, timing, infrared, mute, and others |
| Fan | Rotational speed | On/off, shake, stop, and others |
| Electric curtain | Open position | On/off |
| Lighting device | Brightness | On/off, different lighting modes, and the like |

Alternatively, whether function parameters are progressive or non-progressive may not be distinguished, and a unified recommendation is performed for all function parameters in combination with a whole control interface image.

430. Receive setting information sent, according to the setting interfaces, by a user, including receiving a target device identifier confirmed or selected by the user and receiving a function parameter of a target device confirmed or selected by the user.

Optionally, when an interface for confirming or selecting a control interface image is also provided, this step further includes receiving setting information, sent by the user, about confirming or selecting a control interface image.

Preferably, at least correspondence between the target device identifier, an operation instruction for the control interface image, and a function parameter represented by the operation instruction may be obtained according to the foregoing information.

For example, for a television in a living room, a user may identify it as television 1 and obtain all setting information according to a recommendation on a control terminal and a function parameter selected by the user, as shown in the following Table 2:

TABLE 2

| Target Device Identifier | Operation Instruction for Control Interface Image | Function Parameter |
|---|---|---|
| Television 1 | Sliding a progressive control interface image from left to right, or clicking the right side of the progressive control interface image | Turning up volume by one or more units |
| | Sliding a progressive control interface image from right to left, or clicking the left side of the progressive control interface image | Turning down volume by one or more units |
| | Different induction areas, such as a central circle and different tentacles on a non-progressive control interface image | On/off, channel + 1, channel − 1, and mute |

Optionally, 440, an original parameter, about control configuration, of the target device is received and stored. Certainly, in an alternative solution, the original parameter may be uniformly preset on the control terminal (01).

In a specific example, a related original parameter may be provided by the manufacturer or vendor of the target device through the Internet or a dedicated network of an operator, or a dedicated network of the vendor.

For example, when selling television 1, the vendor of the television 1 provides an original parameter of control configuration for television 1 through a computer in a wired manner; or the manufacturer provides an original parameter of control configuration for televisions of a corresponding model at the company website of the manufacturer; or a third-party service provider acquires an original parameter from various manufacturers and provides it. If television 1 is capable of receiving an infrared remote control signal and is also capable of receiving a value of a Bluetooth remote control signal, the original parameter may include a value of an infrared control signal and a value of a Bluetooth control signal. Values of various control signals are based on the related prior art, or comply with various technical standards, and are represented here by using only symbols without detailed examples.

Step 440 and step 410, 420 or 430 have no precedence relationship and may be performed simultaneously or in parallel.

Preferably, step 440 is performed after step 430, only values of control signals corresponding to several function parameters that have been confirmed or selected by the user in step 430 are stored, and information of other function parameters is ignored. For example, in the preceding example for television 1, the original parameter of control configuration is shown in the following Table 3:

TABLE 3

| Target Device Identifier | Function Parameter | Value of Control Signal (Infrared) | Value of Control Signal (Bluetooth) |
|---|---|---|---|
| Television 1 | Turning up volume by a unit | Frequency 1 | Command 1 |
| Television 1 | Turning down volume by a unit | Frequency 2 | Command 2 |
| Television 1 | Channel + 1 | Frequency 3 | Command 3 |
| Television 1 | Channel − 1 | Frequency 4 | Command 4 |
| Television 1 | On | Frequency 5 | Command 5 |
| Television 1 | Off | Frequency 6 | Command 6 |
| Television 1 | Mute | Frequency 7 | Command 7 |

450. data about correspondence between a user operation instruction for the control interface image and a value of a control signal is generated and stored according to the information set by the user and the original parameter, about control configuration, of the target device.

Specifically, the generated user operation instructions for the control interface image are shown in the following Table 4.

TABLE 4

| Control Interface Image | Operation Instruction for the Image |
|---|---|
| Progressive control interface image | Sliding from small to large |
| Non-progressive control interface image (rudder type) | Sliding from large to small |
| | Long pressing rudder disk center 0/1 |
| | Clicking tentacle 1 |
| | Clicking tentacle 2 |

TABLE 4-continued

| Control Interface Image | Operation Instruction for the Image |
|---|---|
| | Clicking tentacle 3 |
| | Long pressing a rudder tentacle at a first layer . . . |

For example, according to the information in the foregoing Table 1, Table 2, Table 3, and Table 4, data, as shown in the following Table 5, about the correspondence between the user operation instruction for the control interface image and the value of the control signal is generated.

TABLE 5

| Target Device Identifier | Operation Instruction for Control Interface Image | Value of Control Signal (Infrared) | Value of Control Signal (Bluetooth) |
|---|---|---|---|
| Television 1 | Sliding from small to large for a progressive control interface image | Frequency 1 | Command 1 |
| | Sliding from large to small for a progressive control interface image | Frequency 2 | Command 2 |
| | Long pressing rudder disk center 0 | Frequency 5 | Command 5 |
| | Long pressing rudder disk center 1 | Frequency 6 | Command 6 |
| | Clicking tentacle 1 | Frequency 3 | Command 3 |
| | Clicking tentacle 2 | Frequency 4 | Command 4 |
| | Clicking tentacle 3 | Frequency 7 | Command 7 |

Optionally, 460, a control interface image that has been set with a target device identifier and a function parameter is generated and displayed through a screen, so that the user subsequently implements control for the target device according to the control interface and the foregoing stored data about the correspondence between the user operation instruction for the control interface image and the value of the control signal. After the setting is completed, or in a subsequent usage process of the user, the control interface that has been set needs to be displayed.

Optionally, 470, an operation instruction of the user for the control interface image is received and identified, the stored correspondence is queried to obtain a corresponding value of a control signal, and a corresponding control signal is generated and sent.

It should be noted that, Tables 1-5 mentioned in the preceding embodiment are only for ease of description. In a practical embodiment, it is not limited to the storage form of tables and may be various possible recording manners, such as a database, a character string, a management tree, and the like, as long as related data can be stored.

In another embodiment, for one or more target devices to be set by a user, a whole setting for a function parameter combination may be provided by adopting a working mode based on a function setting (a setting performed on a specific function parameter) shown in FIG. 4, or in replace of a solution of a function setting shown in FIG. 4, so as to further simplify a control interface and a subsequent control operation of the user.

For example, a "working mode" choice is provided for each target device, and a parameter setting of the working mode may be by default a working mode (function parameter combination) that a target device originally has, and may also be a reset function parameter combination. For another example, a whole "working mode" choice is provided for each target device of a family (or a same user). For example, recommended "get-up mode", "away mode", "home mode", and "rest mode" are provided for the whole "working mode" choice. For example, the "get-up mode" includes that a user confirms the get-up time 7:00, the user confirms that target device 1 (an acoustic device) is powered on when the time is reached, its volume is turned to 10 decibels, an electric curtain is opened, and the like; for the "away mode", it may include that a user confirms a list of target devices that should be closed when an "away mode" button is clicked; for the "home mode", it may be that a user confirms a list of target devices that should be opened when an "away mode" button is clicked, for example, a lighting device is opened, an air conditioner is opened, and temperature is turned to 25 degrees; for the "rest mode", it may be that a user confirms a list of target devices that should be closed when the "rest mode" is clicked, and the like.

In the following specific embodiments, detailed descriptions are provided for a setting interface, a setting process, and a set control interface image by using the example in the preceding embodiments.

501. A control terminal (01) receives an instruction, for example, "clicking to add a target device", triggered by a user through various possible interfaces, for adding a remotely controlled target device, and displays a setting interface shown in FIG. 5 on the control terminal to prompt the user to input a target device identifier.

Specifically, the control terminal (01) can receive, through an original or a downloaded and installed configuration program of the control terminal (01) on the control terminal (01), the instruction of the user for adding a target device.

502. After receiving the target device identifier input by the user, display a setting interface shown in FIG. 6. Take a target device identifier TV1 as an example. According to the received target device identifier, it is confirmed that the type of the target device is a broadcast-type audio and video device and a corresponding default interface is displayed through a screen.

Figure 5:
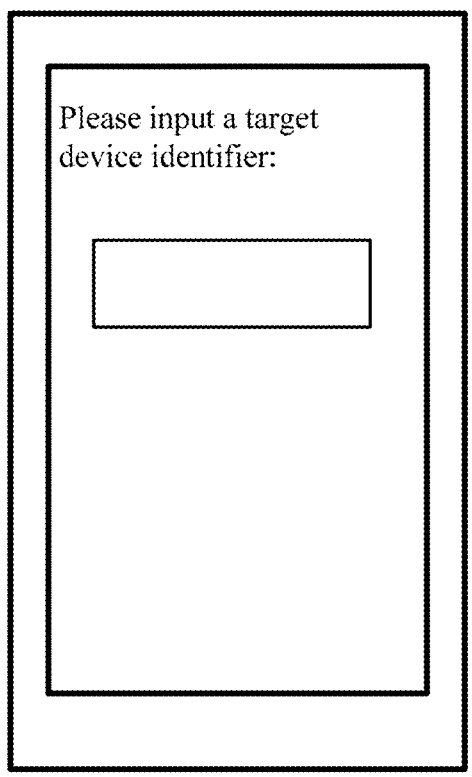
FIG. 5 is a schematic diagram of a setting interface in a process of setting a remote control apparatus.
Figures 6, 7:
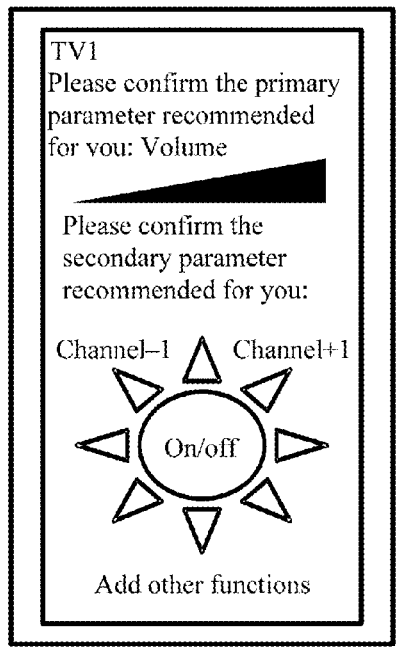
FIG. 6 is a schematic diagram of a setting interface in a process of setting a remote control apparatus.
FIG. 7 is a schematic diagram of a setting interface in a process of setting a remote control apparatus.

An interface figure of secondary parameters in FIG. 6 is of a rudder type, and it may also be of a ring type, semi-rudder type (less than 360 degrees), or semi-ring type (less than 360 degrees). Optionally, the maximum number of "tentacles", that is, "function unit images", of a rudder-type, disk-type, or other similar non-progressive image interface is tacitly approved. The number of ultimately displayed tentacles, not shown in FIG. 5, is determined by the number of function parameters (including recommended and added ones) finally confirmed by the user.

504. Optionally, if an instruction of the user about "adding other functions" is received after an instruction that the user has confirmed a primary parameter and a secondary parameter is received, display, according to the type of the target device, a setting interface, for example, a setting interface FIG. 7, including an option of a function to be selected to the user, where other functions to be selected include settings of brightness adjustment, channels 0-9, mute, input information AV/TV, contrast, and the like.

Figure 8:
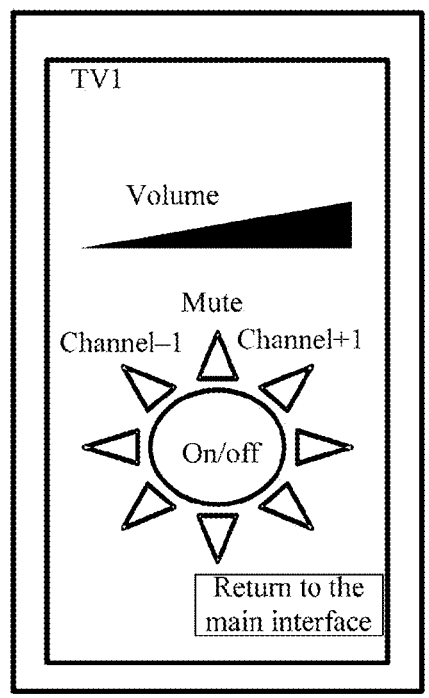
FIG. 8 is a schematic diagram of a set control interface.

505. Optionally, after receiving a setting instruction of the user according to a setting interface shown in FIG. 7, display a control interface that has been set. For example, if the user has added the "mute" function, an interface that has been set with a target device identifier and a function parameter is shown in FIG. 8.

Figure 9:
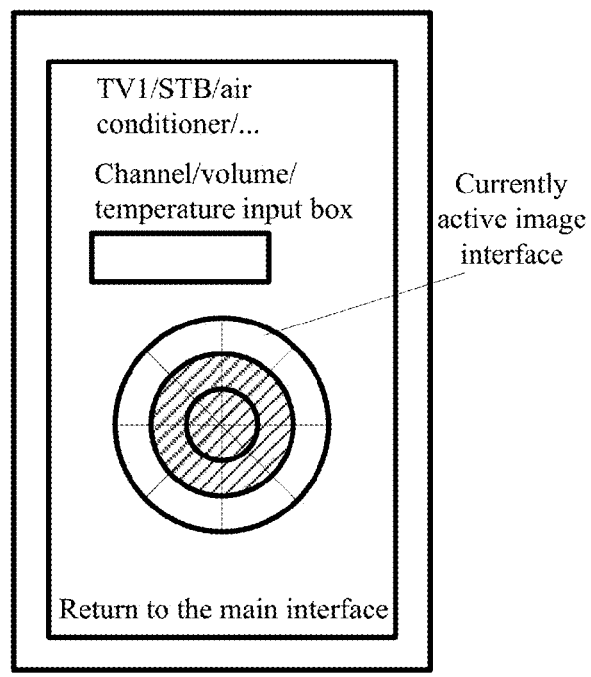
FIG. 9 is a schematic diagram of a setting interface in a process of setting a remote control apparatus.

Refer to FIG. 9. If values of "function parameter" added by the user are greater than the maximum number, two overlapped layers of non-progressive image interfaces may be displayed, and the coverage area of the surface layer is less than the coverage area of the inner layer. In a practical usage process, an operation instruction of a user for long pressing a certain layer may be received to activate a function parameter at that layer. To allow the user to clearly identify an activated interface layer, a currently activated non-progressive image interface may be displayed in multiple manners, such as a brightness increase and a color change. A manner of input boxes may also be adopted for certain function parameters, and the user directly inputs a value of a function parameter in digits, letters, or their combinations.

In a practical application process, a setting of a control interface for multiple target devices may be implemented on a control terminal through the preceding setting process, and reference is made to Table 6.

TABLE 6

| Target Device Identifier | Function Parameter on Progressive Control Interface Image | Function Parameter on Non-progressive Control Interface Image |
|---|---|---|
| Television 1 | Volume | On/off, channel + 1, channel − 1, and mute |
| Television 2 | Volume | On/off, channels 1-10, high brightness, and low brightness |
| Air conditioner 1 | Temperature | On/off, windy, no wind, and dehumidification |
| DVD player | Volume | On/off, play, pause, fast-forward, and rewind |
| Set-top box | Volume | On/off, input manner, channel + 1, and channel − 1 |
| Refrigerator | Temperature | On/off |
| Dehumidifier | Humidity | On/off, timing, infrared, and mute |
| Fan | Rotational speed | On/off and shake/stop |
| In-car media device | Volume | On/off, play, pause, fast-forward, and rewind |
| Air cleaner | | On/off |

Optionally, or in replace of the preceding 501-505, 506, "Please confirm the working mode of a target device (a specific target device identifier)" or "Please confirm the working modes of all target devices" is displayed for the user on the screen, where the working mode may have default recommendations such as "get-up mode", "away mode", "home mode", and "rest mode", and accordingly, an instruction of the user for confirming a working mode is received.

Figure 10:
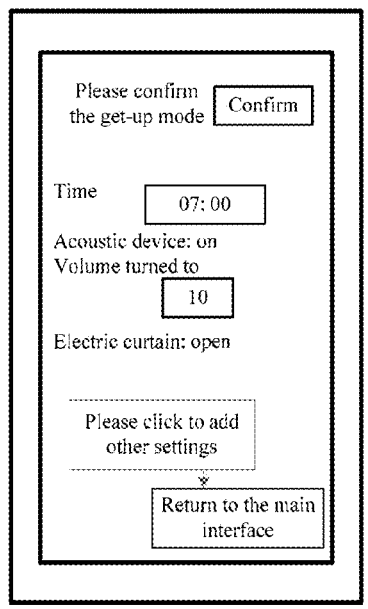
FIG. 10 is a schematic diagram of a setting interface in a process of setting a remote control apparatus.

507, with reference to FIG. 10, after receiving the instruction of the user for confirming a working mode, default or recommended function parameter combinations under various working modes may further be displayed; if the working mode is for a whole of multiple target devices, a recommended target device identifier and its function parameter combination are displayed according to a target device identifier that has been set, so as to receive user confirmation.

508, when using the control terminal (01), the user may perform an operation instruction on a control interface of a certain target device, and the control terminal (01) identifies and parses the operation instruction into a value of a control signal and generates a corresponding control signal to implement control for the target device. It may also be that the control terminal (01), after receiving a user operation instruction with a selected "working mode" (or a trigger condition preset by the user is met), acquires a corresponding function parameter combination according to the "working mode", parses it into a value of a control signal, and generates a corresponding control signal to implement control for the target device.

In the preceding embodiment, the number of target devices that may be integrated on a control terminal is not limited, and the number of its control functions is also not limited, which further increases the universality of a remote control apparatus; control interfaces set for these different target devices may have similar control interface images, which makes it easier for the user to remember and use; in addition, a set control terminal only needs to store function parameters and control instructions that the user needs to use, which reduces unnecessary waste of storage resources.

Figure 11:
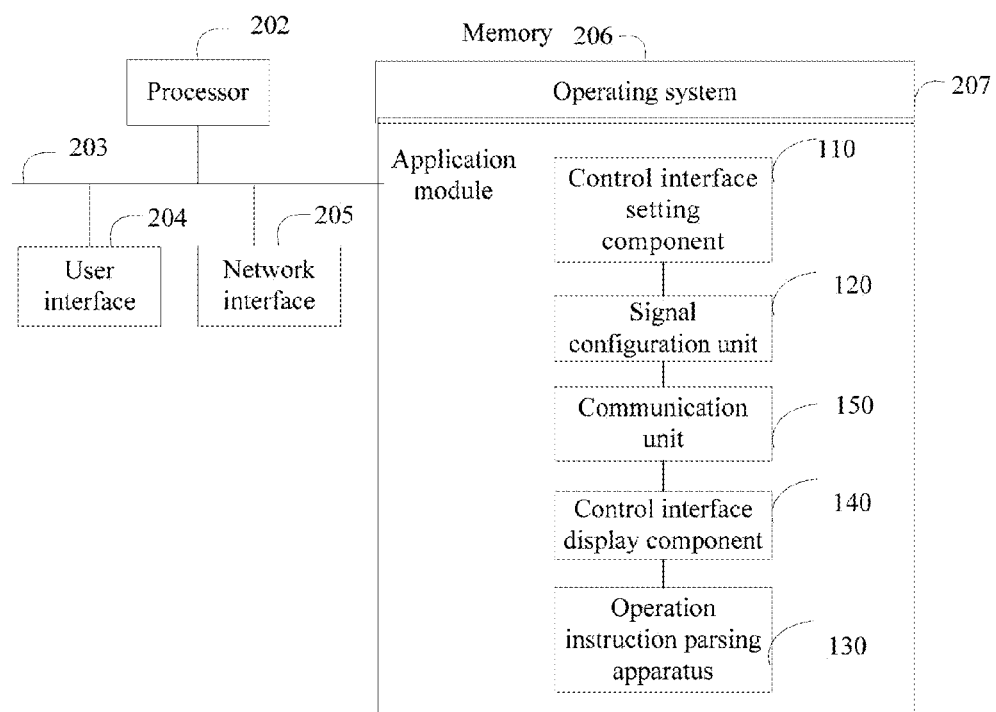
FIG. 11 is a schematic structural diagram of a control terminal (01) according to an embodiment of the present invention.

FIG. 11 is a schematic structural diagram of another embodiment of a terminal control terminal (01) in a system. It should be noted that, a control interface setting unit (110) and a signal configuration unit (120) may be physically separated from the control terminal (01).

The control terminal (01) generally includes at least one processor (202) (for example, a CPU), at least one network interface or another communication interface (205), a memory (206), and at least one communication bus (203) configured to implement connections and communications between these apparatuses. The processor (202) is configured to perform an executable module, for example, a computer program, stored in the memory. Optionally, the control terminal (01) further includes a user interface (204), including but not limited to a display, a keyboard, and a pointing device (for example, a mouse, a trackball (trackball), a touch panel, or a touchscreen). The memory (206) may include a high-speed RAM memory, and may further include a non-volatile memory (non-volatile memory), for example, at least one disk memory. Through the at least one network interface (may be wired or wireless), communication and connection between the control terminal (01) and at least one other computer may be implemented by using the Internet, a wide area network, a local area network, a metropolitan area network, and the like. Specifically, the control terminal (01) itself may include a control signal sending apparatus (180) (for example, an infrared signal transmitter, a Bluetooth signal sending device) or communicates with and connects to at least one control signal sending apparatus (180).

Optionally, the memory (206) may include at least one storage apparatus (for example, an external storage apparatus) located at a place away from the CPU. In some embodiments, the memory (206) stores the following elements, executable modules, or data structures, or their subsets, or their extension sets:

an operating system (207), configured to include various programs, which are configured to implement various basic services and process hardware-based tasks, and one or any combination of the following modules:
a control interface setting unit (110), a signal configuration unit (120), a communication unit (150), a control interface display unit (140), and an operation instruction parsing apparatus (130).

Partial or all function descriptions of each of the preceding modules are mentioned in the foregoing embodiments, and details are not provided herein.

The embodiments provided above may facilitate a method and an apparatus for uniformly controlling one or more target devices or a flexible and convenient setting method, and some embodiments may further save the storage resources of a control apparatus.

The described apparatus embodiments are merely exemplary, where, the units described as separate parts may or may not be physically separated, and parts displayed as units may or may not be physical units, may be located in one position, or may be distributed on a plurality of network elements. A part or all of the modules may be selected according to actual needs to achieve the objectives of the solutions of the embodiments. Persons of ordinary skill in the art may understand and implement the embodiments without creative efforts.

Through the foregoing description of the implementation, it is clear to persons skilled in the art that, the embodiments may be implemented through software plus a necessary universal hardware platform or through hardware. Based on such an understanding, the foregoing technical solutions essentially, or the part contributing to the prior art may be implemented in the form of a software product. The computer software product may be stored in a computer readable storage medium such as a RAM/ROM, a magnetic disk, or an optical disk, and includes several instructions for instructing a computer device (which may be a personal computer, a server, or a network device) to perform all or a part of the methods described in the embodiments.

The foregoing embodiments are not intended to limit the scope of the technical solutions. Any modification, equivalent replacement, and improvement made within the spirit and principle of the foregoing embodiments shall fall within the protection scope of the technical solutions.

What is claimed is:
1. A method for controlling at least one target device, the method comprising:
receiving an instruction from a user to select a function parameter of one of the at least one target device;
determining whether the selected function parameter is a progressive parameter or a non-progressive parameter;
associating the selected function parameter with a progressive control interface image when the selected function parameter is the progressive parameter; and associating the selected function parameter with a non-progressive control interface image when the selected function parameter is the non-progressive parameter; wherein both the progressive control interface image and the non-progressive control interface image are visual operation interfaces used to control target devices and displayed through a screen;
generating and storing, a relationship among an identifier of the one of the at least one target device, the selected function parameter, the progressive/non-progressive control interface image, and a value of a control signal associated with the selected function parameter; and receiving another instruction from the user through the progressive/non-progressive control interface image to control the one of the at least one target device via the control signal;

wherein the progressive control interface image embodies linear changes of a value of a certain function, includes a homogeneous linear image, an incremental linear image, or a bilaterally symmetrical long-type image; and the non-progressive control interface image embodies jumping changes of multiple function, includes a rudder type or ring type.

2. The method according to claim 1, wherein receiving another instruction from the user through the progressive/non-progressive control interface image comprises:

providing a third interface for confirming or selecting the progressive/non-progressive control interface image; and receiving setting information, sent by the user, about confirming or selecting the progressive/non-progressive control interface image.

3. The method according to claim 1, further comprising:

generating and displaying, through the screen, a control interface image that has been set with the identifier of the one of the at least one target device and the function parameter; and receiving and identifying the operation instruction of the user for the control interface image, querying a stored correspondence to obtain the value of the control signal, and generating and sending a corresponding control signal.

4. The method according to claim 1, wherein receiving an instruction from a user to select a function parameter of one of the at least one target device, comprises:

displaying the function parameter of a target device to be confirmed or selected, or displaying a function parameter combination of the target device to be confirmed or selected; and receiving the function parameter of the target device or the function parameter combination of the target device confirmed or selected by a user.

5. The method according to claim 4, wherein the function parameter of the target device to be confirmed is recommended by default according to a type of the target device; and the function parameter combination of the target device to be confirmed is recommended by default according to a usage scenario of the target device.

6. The method according to claim 1, wherein receiving an instruction from a user to confirm or select a function parameter of one of the at least one a target device, comprises:

displaying a function parameter combination to be confirmed or selected for a plurality of target devices; and receiving the function parameter combination confirmed or selected by the user for the plurality of target devices.

7. The method according to claim 6, wherein the function parameter combination to be confirmed for the plurality of target devices is recommended by default according to a demand of using the plurality of target devices.

8. The method according to claim 1, wherein two overlapped layers of non-progressive control interface images are displayed when values of function parameters input by a user are greater than a maximum number; and wherein a coverage area of a surface layer is less than a coverage area of an inner layer.

9. An apparatus for controlling at least one target device, comprising a control interface setting unit and a signal configuration unit that communicates with and connects to the control interface setting unit, wherein:

the control interface setting unit is configured to receive an instruction from a user to select a function parameter of one of the at least one target device; determine whether the selected function parameter is a progressive parameter or a non-progressive parameter; associate the selected function parameter with a progressive control interface image when the selected function parameter is the progressive parameter; and associate the selected function parameter with a non-progressive control interface image when the selected function parameter is the non-progressive parameter; wherein both the progressive control interface image and the non-progressive control interface image are visual operation interfaces used to control target devices and displayed through a screen; and the signal configuration unit is configured to generate and store, a relationship among an identifier of the one of the at least one target device, the selected function parameter, the progressive/non-progressive control interface image, and a value of a control signal associated with the selected function parameter; receive another instruction from the user through the progressive/non-progressive control interface image to control the one of the at least one target device via the control signal;

wherein the progressive control interface image embodies linear changes of a value of a certain function, includes a homogeneous linear image, an incremental linear image, or a bilaterally symmetrical long-type image; and the non-progressive control interface image embodies jumping changes of multiple function, includes a rudder type or ring type.

10. The apparatus according to claim 9, wherein a module providing a control interface image is configured in the control interface setting unit, to provide a third interface for confirming or selecting the progressive/non-progressive control interface image and receiving setting information, sent by the user, about confirming or selecting the progressive/non-progressive control interface image.

11. The apparatus according to claim 9, further comprising:

a control interface display unit, configured to generate and display, through the screen, a control interface image that has been set with the identifier of the one of the at least one selected target device and the function parameter; and an operation instruction parsing apparatus, configured to receive and identify the operation instruction of the user for the control interface image, obtain the value of the control signal according to a correspondence in the signal configuration unit, and forward the value of the control signal to a control signal sending apparatus.

12. The apparatus according to claim 11, further comprising:

the control signal sending apparatus, configured to generate, according to the received value of the control signal, the control signal and send the control signal to the target device to which the target device identifier of the selected target device points.

13. A system for implementing remote control, comprising a processing apparatus and a server;
- wherein the processing apparatus controls at least one target device, and comprises a control interface setting unit and a signal configuration unit that communicates with and connects to the control interface setting unit, wherein:
- the control interface setting unit is configured to receive an instruction from a user to select a function parameter of one of the at least one target device; determine whether the selected function parameter is a progressive parameter or a non-progressive parameter; associate the selected function parameter with a progressive control interface image when the selected function parameter is the progressive parameter; and associate the selected function parameter with a non-progressive control interface image when the selected function parameter is the non-progressive parameter; wherein both the progressive control interface image and the non-progressive control interface image are visual operation interfaces used to control target devices and displayed through a screen; and
- the signal configuration unit is configured to generate and store, a relationship among an identifier of the one of the at least one target device, the selected function parameter, the progressive/non-progressive control interface image, and a value of a control signal associated with the selected function parameter; receive another instruction from the user through the progressive/non-progressive control interface image to control the one of the at least one target device via the control signal;
- wherein the server is configured to provide an original parameter of the one of the at least one target device, wherein the original parameter comprises the selected function parameter and the value of the control signal corresponding to the selected function parameter;
- wherein the progressive control interface image embodies linear changes of a value of a certain function, includes a homogeneous linear image, an incremental linear image, or a bilaterally symmetrical long-type image; and the non-progressive control interface image embodies jumping changes of multiple function, includes a rudder type or ring type.

14. The system according to claim 13, wherein
- a module providing a control interface image is configured in the control interface setting unit, to provide a third interface for confirming or selecting the progressive/non-progressive control interface image and receiving setting information, sent by the user, about confirming or selecting the progressive/non-progressive control interface image.

15. The system according to claim 13, wherein the processing apparatus further comprises:
- a control interface display unit, configured to generate and display, through the screen, a control interface image that has been set with the identifier of the one of the at least one selected target device and the function parameter; and
- an operation instruction parsing apparatus, configured to receive and identify the operation instruction of the user for the control interface image, obtain the value of the control signal according to a correspondence in the signal configuration unit, and forward the value of the control signal to a control signal sending apparatus.

16. The system according to claim 15, wherein the processing apparatus further comprises:
- the control signal sending apparatus, configured to generate, according to the received value of the control signal, the control signal and send the control signal to the target device to which the identifier of the one of the at least one selected target device points.

* * * * *

UNITED STATES PATENT AND TRADEMARK OFFICE
CERTIFICATE OF CORRECTION

PATENT NO. : 9,633,558 B2  Page 1 of 1
APPLICATION NO. : 14/141047
DATED : April 25, 2017
INVENTOR(S) : Junxiu Wang It is certified that error appears in the above-identified patent and that said Letters Patent is hereby corrected as shown below:

In the Claims

Column 18, Line 67, "target device identifier" should read -- identifier --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*